United States Patent
Bonczek et al.

(10) Patent No.: US 8,884,886 B2
(45) Date of Patent: Nov. 11, 2014

(54) TOUCH SENSITIVE VIDEO SIGNAL DISPLAY FOR A PROGRAMMABLE MULTIMEDIA CONTROLLER

(75) Inventors: Bryan S. Bonczek, Brooklyn, NY (US); Michael C. Silva, East Sandwich, MA (US); Robert P. Madonna, Osterville, MA (US)

(73) Assignee: Savant Systems, LLC, Hyannis, MA (US)

( * ) Notice: Subject to any disclaimer, the term of this patent is extended or adjusted under 35 U.S.C. 154(b) by 1053 days.

(21) Appl. No.: 12/434,189

(22) Filed: May 1, 2009

(65) Prior Publication Data
US 2009/0303197 A1    Dec. 10, 2009

Related U.S. Application Data

(60) Provisional application No. 61/126,311, filed on May 2, 2008.

(51) Int. Cl.
| | |
|---|---|
| G06F 3/041 | (2006.01) |
| H04N 5/44 | (2011.01) |
| G06F 3/0486 | (2013.01) |
| H04N 21/44 | (2011.01) |
| G06F 3/0488 | (2013.01) |
| H04N 21/472 | (2011.01) |
| H04N 21/431 | (2011.01) |
| H04N 5/445 | (2011.01) |
| H04N 5/765 | (2006.01) |
| H04N 21/41 | (2011.01) |
| H04N 21/443 | (2011.01) |
| H04N 21/436 | (2011.01) |

(52) U.S. Cl.
CPC ........... *H04N 21/443* (2013.01); *H04N 5/4403* (2013.01); *G06F 3/0486* (2013.01); *H04N 21/44012* (2013.01); *G06F 3/0488* (2013.01); *H04N 21/47205* (2013.01); *H04N 21/4314* (2013.01); *H04N 21/4312* (2013.01); *H04N 5/44591* (2013.01); *H04N 5/765* (2013.01); *H04N 21/4126* (2013.01); *H04N 21/43615* (2013.01)
USPC .......................................... 345/173; 345/174

(58) Field of Classification Search
USPC .................................................. 345/168–179
See application file for complete search history.

(56) References Cited

U.S. PATENT DOCUMENTS

| | | | |
|---|---|---|---|
| 5,745,710 | A | 4/1998 | Clanton, III |
| 5,767,897 | A | 6/1998 | Howell |

(Continued)

FOREIGN PATENT DOCUMENTS

| | | |
|---|---|---|
| JP | H8-79847 | 3/1996 |
| JP | H10-098667 | 4/1998 |

(Continued)

OTHER PUBLICATIONS

Tonomura Y et al., "Content Oriented Visual Interface Using Video Icons for Visual Database Systems," *Journal of Visual Languages and Computing*, London, GB, vol. 1, Jan. 1, 1990, pp. 193-198.

(Continued)

*Primary Examiner* — Alexander Eisen
*Assistant Examiner* — Nelson Lam
(74) *Attorney, Agent, or Firm* — Cesari and McKenna, LLP

(57) ABSTRACT

The forgoing method, system, and apparatus relates to a touch sensitive display for use with a programmable multimedia controller. In the illustrative system, the user may select and designate a video input device to be implemented on a video output display device within the user's network of devices. The media input devices and output devices are selected by the user touching a touch sensitive button located on the display screen. To initiate an action the user touches, drags and drops a media input device button onto one or more video output display device buttons. Furthermore, when the user selects a media input device to be implemented on a video output display device, the user may also select a video signal source to apply to that media input device for a transaction. A live stream of what is playing on a given channel is provided on the screen.

15 Claims, 11 Drawing Sheets

(56) References Cited

U.S. PATENT DOCUMENTS

| | | | |
|---|---|---|---|
| 6,437,836 B1* | 8/2002 | Huang et al. | 348/734 |
| 7,222,356 B1* | 5/2007 | Yonezawa et al. | 725/105 |
| 7,461,343 B2* | 12/2008 | Kates | 715/716 |
| 2003/0103088 A1 | 6/2003 | Dresti et al. | |
| 2003/0151538 A1* | 8/2003 | Escobosa et al. | 341/176 |
| 2003/0170060 A1* | 9/2003 | Nakadaira et al. | 400/61 |
| 2003/0184647 A1* | 10/2003 | Yonezawa et al. | 348/143 |
| 2005/0024488 A1* | 2/2005 | Borg | 348/36 |
| 2006/0050142 A1* | 3/2006 | Scott et al. | 348/14.05 |
| 2006/0087941 A1* | 4/2006 | Obradovich | 369/47.12 |
| 2006/0267995 A1* | 11/2006 | Radloff et al. | 345/530 |
| 2007/0063860 A1* | 3/2007 | Escobosa et al. | 340/825.22 |
| 2007/0142022 A1 | 6/2007 | Madonna | |
| 2007/0143801 A1 | 6/2007 | Madonna | |
| 2007/0229465 A1* | 10/2007 | Sakai et al. | 345/173 |
| 2008/0079604 A1* | 4/2008 | Madonna et al. | 345/173 |
| 2008/0196068 A1 | 8/2008 | Tseng | |
| 2009/0240502 A1* | 9/2009 | Kemplin | 704/275 |
| 2012/0044061 A1* | 2/2012 | Sakai et al. | 340/12.5 |
| 2012/0198500 A1* | 8/2012 | Sheeley | 725/61 |

FOREIGN PATENT DOCUMENTS

| | | |
|---|---|---|
| JP | 2001-92575 | 4/2001 |
| WO | WO2007-075797 A2 | 7/2007 |

OTHER PUBLICATIONS

U.S. International Search Report mail date Apr. 8, 2009 for International Application No. PCT/US2009/002690, filed Jan. 5, 2009, 18 pages.

U.S. Appl. No. 61/126,311 entitled Touch Sensitive Video Signal Display Selection for a Programmable Multimedia Controller, filed May 2, 2008 by Bryan Bonczek.

* cited by examiner

US 8,884,886 B2

TOUCH SENSITIVE VIDEO SIGNAL DISPLAY FOR A PROGRAMMABLE MULTIMEDIA CONTROLLER

CROSS-REFERENCE TO RELATED APPLICATIONS

The present application claims the benefit of U.S. Provisional Patent Application Ser. No. 61/126,311, which was filed on May 2, 2008, by Bryan Bonczek, for a TOUCH SENSITIVE VIDEO SIGNAL DISPLAY SELECTION FOR A PROGRAMMABLE MULTIMEDIA CONTROLLER, and is hereby incorporated by reference. The present invention is related to the following copending United States patent applications: SYSTEM AND METHOD FOR A PROGRAMMABLE MULTIMEDIA CONTROLLER, filed Dec. 20, 2005, and assigned Ser. No. 11/314,664, and PROGRAMMABLE MULTIMEDIA CONTROLLER WITH PROGRAMMABLE SERVICES, filed Dec. 20, 2005, and assigned Ser. No. 11/314,112, which are hereby incorporated by reference herein.

BACKGROUND OF THE INVENTION

Field of the Invention

The present invention relates generally to a touch sensitive display which, when interconnected with a programmable multimedia controller, may be used to selectively connect one or more video signal sources to one or more video display devices.

SUMMARY OF THE INVENTION

A touch sensitive display, which is interconnected with a programmable multimedia controller, enables a user to selectively connect a desired video input device with one or more video output display devices. Touch sensitive "buttons" or areas, each of which may represent or correspond to a video input device or a video output display device, are presented on the touch sensitive display. Available video input devices may include cable television, satellite television, DVD players, DVR, VCR gaming systems or other sources and components. Additionally, a video signal source such as cable television (Comcast®), satellite (DirectTV®), or digital television (local channels) offer a wide range of programming content on many channels such as CNN, ESPN and the like. In addition, the programmable media controller is also coupled to audio-only devices, such as a radio, satellite radio, CD player, digital audio players, personal media devices and the like. As used herein, video input device also includes such audio only components. The video and audio devices, sources, channels, programming and content are sometimes collectively referred to herein as "media input." It should also be understood that the terms "video input" and "video input device" as used herein also encompasses audio input devices, and that the term "video signal source" encompasses audio signal sources.

The user can also choose, as described further herein, which channel to send to a particular video output display device if one of the television video signal sources is selected for one of the video output display devices. Available video output display devices may include televisions, CRTs, touch panels, flat panel displays or others which are located throughout a home or a commercial establishment.

In the illustrative system, the user may select a desired video input device to be connected, by way of a video switch located within the programmable multimedia controller, to a desired video output display device. To make such a selection, the user first touches a desired video output display device button, thus effectively selecting the video output display device associated with that button. Next, the user touches a desired video input device button. This gesture causes the video switch to create a communication path between the selected video input device and the selected video output display device. In addition, a "tag" appears on the video output display device button which provides a visual cue of what video input device is currently connected to the output device associated with that button.

As noted, when the user selects a video input device, the user may also select a video signal source to apply to that video input device. Touch sensitive buttons which represent or correspond to video signal sources, such as broadcast, cable or satellite channels or other sources, are presented on the touch sensitive display. Video signal source buttons may display a live stream of what is playing on the corresponding video signal source. In this fashion, the user is able to see currently playing programs before deciding which video signal source to choose. Once a video signal source is chosen by the user, the video signal source may be streamed onto each button corresponding to each video output display device on which the chosen video signal is displayed. Thus, prior to changing any selections, the user is able to see what program is currently displayed on each of the video output display devices.

The user may also "broadcast" a video signal source to multiple video output display devices. To do this, the user selects multiple video output display devices by touching the corresponding video output display device buttons. To broadcast a video signal from one video output device to all of the selected video output display devices, the user touches, drags and drops a video input device button onto one of the selected video output display device buttons. Additionally, the user may swap the video input devices (or video signal sources) connected to two different video output display devices.

BRIEF DESCRIPTION OF THE DRAWINGS

The invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
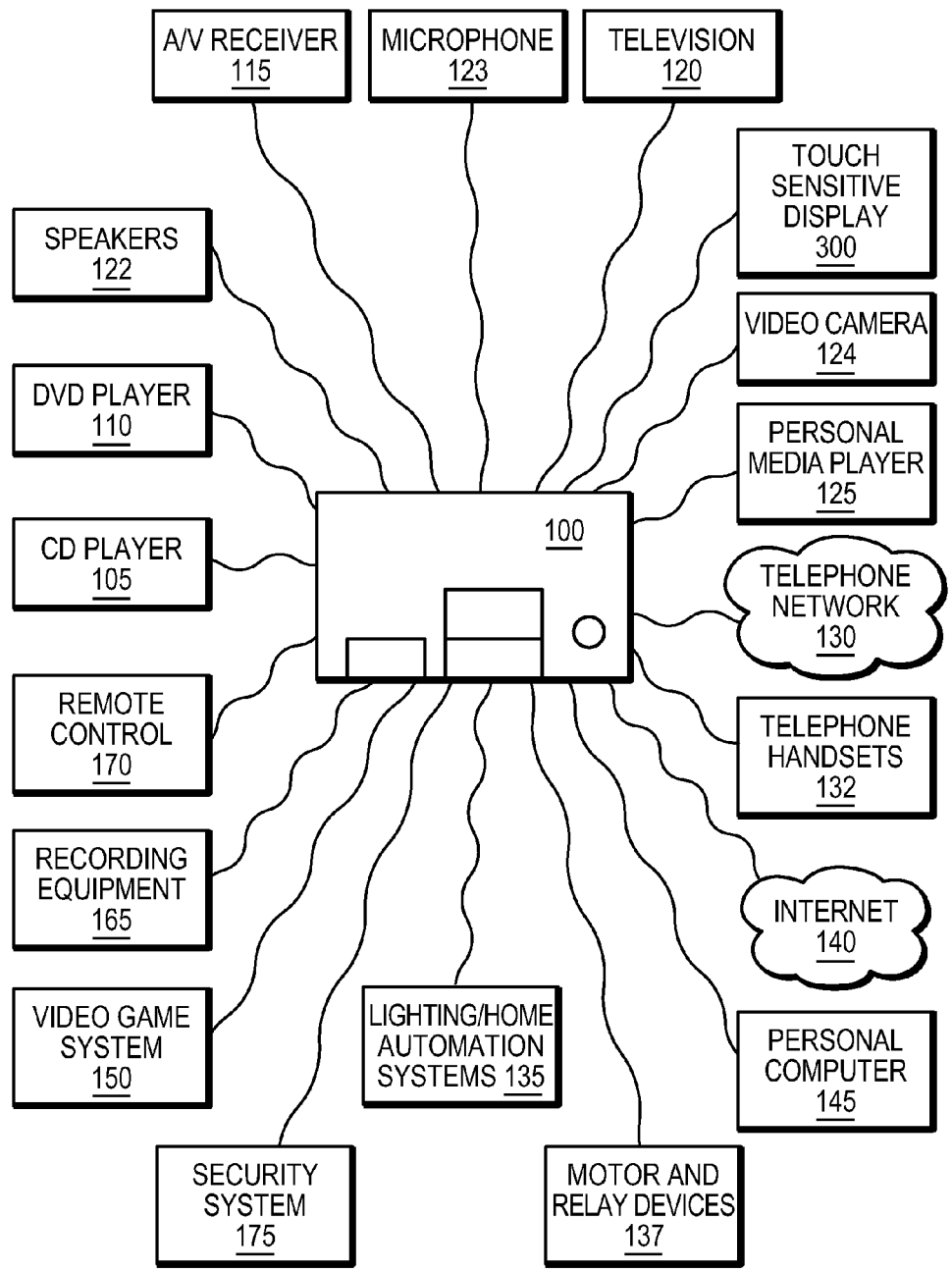
FIG. 1 is a block diagram of a programmable multimedia controller, interconnected to a number of devices including video input devices and video output display devices, according to an illustrative embodiment of the present invention.

FIG. 1 is a block diagram of a programmable multimedia controller (PMC) 100, interconnected to a number of devices, according to an illustrative embodiment of the present invention. The term "programmable multimedia controller" should be interpreted broadly as a device capable of controlling, switching data between, or otherwise interoperating with, a variety of electronic devices, such as audio, video, telephony, data, security, motor-operated, relay-operated or other types of devices. By interacting with these devices, the PMC 100 may implement an integrated multimedia control solution.

In the illustrative embodiment, the PMC 100 is connected to a wide range of audio/video components, for example, a compact disk (CD) player 105, a digital video disc (DVD) player 110, an audio/video receiver 115, a television 120, speakers 122, a microphone 123, a video camera 124 and a personal media player 125. The programmable multimedia controller may also be connected to telephony devices such as a telephone network 130 and telephone handsets 132. The telephone network 130 may be a publicly switched telephone network (PSTN), an Integrated Services Digital Network (ISDN) or other communications network.

In addition, the programmable multimedia controller may intercommunicate with variety of lighting and/or home automation systems 135. These devices may operate via the X10 protocol developed by Pico Electronics, the INSTEON™ protocol developed by SmartHome, Inc, the CEBus standard managed by the CEBus Industry Council, RS232, or another well known automation or control protocol. Similarly, controller 100 may be connected to motor/relay operated devices 137 that may include, for example, a heating, ventilation and air conditioning (HVAC) system, an irrigation system, an automatic shade or blind system, an electronic door lock, or other types of devices.

A computer network, such as the Internet 140, is connected to the PMC 100. In addition, a personal computer (PC) 145, video game systems 150, home or studio recording equipment 165 or other devices may also be connected. Further, one or more remote control units 170 may be provided to manage the controller's functionality or to control devices connected to the controller. Such remote control units 170 may be interconnected to the controller via a wired network connection or a wireless connection such as an infra-red link, a radio-frequency link, a Bluetooth™ link, a ZigBee™ link, WI-FI, or another appropriate data connection.

A touch sensitive display 300 is also connected to PMC 100. As described in detail below, touch sensitive display 300 may be used by a user to direct PMC 100 to establish communication paths between desired video input devices (e.g., DVD player 110) and desired video output display devices (e.g., television 120).

Figure 2:
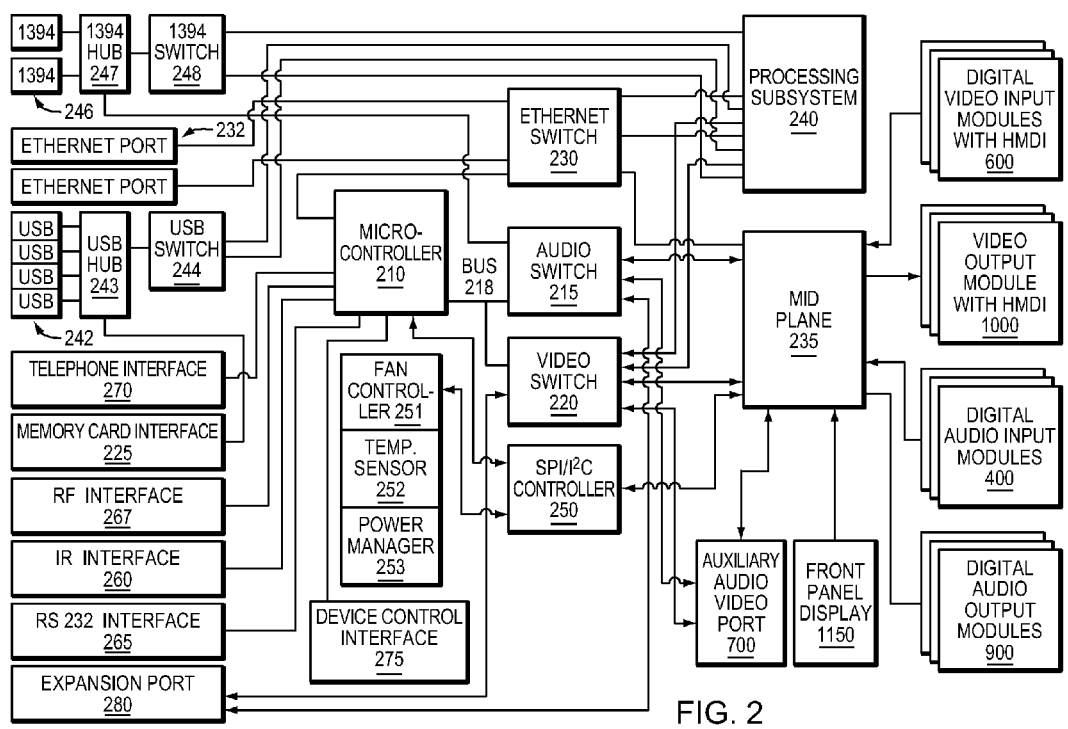
FIG. 2 is a schematic block diagram showing a high-level hardware architecture of the programmable multimedia controller of FIG. 1.

FIG. 2 is a schematic block diagram showing a high-level hardware architecture of the programmable multimedia controller. The various components shown may be arranged on a "motherboard" of the controller, or on a plurality of cards interconnected by a backplane (not shown). A microcontroller 210 manages the general operation of the system. In the illustrative embodiment, the microcontroller is a 32-bit model MCF5234 microcontroller available from Freescale Semiconductor Inc. The microcontroller 210 is coupled to an audio switch 215 and a video switch 220 via a bus 218. The audio switch 215 and the video switch 220 are preferably crosspoint switches capable of switching a number of connections simultaneously. However many other types of switches capable of switching digital signals may be employed, for example Time Division Multiplexing (TDM) switches or other devices.

A mid plane 235 interconnects the switches to a variety of input and output modules such as, for example, Digital Video Input Modules with HDMI 600, Video Output Modules with HDMI 1000, Digital Audio Input Modules 400, and Digital Audio Output Modules 900. The mid plane 235 is further coupled to an Ethernet switch 230 that permits switching of 10BaseT, 100BaseT or Gigabyte Ethernet signals. The Ethernet switch 230 interconnects Ethernet ports 232 and a processing subsystem 240 to the microcontroller 210. In one embodiment, the processing subsystem 240 includes a plurality of small form factor general purpose personal computers that provide redundant operation and/or load balancing. In some embodiments, the processing subsystem 240 may include one or more storage devices, external to the personal computers, to provide expanded storage capacity, for example, to store digital media.

Also, a number of Universal Serial Bus (USB) ports 242 are interconnected to a USB hub 243 for interconnection to the processing subsystem 240. A memory card interface 225 may also be connected to the USB hub 243. The interface accepts one or more well-known memory card formats, for example CompactFlash™ cards, Memory Stick™ cards, Secure Digital™ (SD) cards, or other formats. A USB switch 244 is employed to switch USB links among the multiple processing components that may be present in the processing subsystem 240. In a similar manner, a number of IEEE 1394 (also known as FireWire®) ports 246 are interconnected to an IEEE 1394 hub 247 and to an IEEE 1394 switch 248.

The microcontroller 210 is further connected to a Serial Peripheral Interface (SPI) and Inter-Integrated Circuit ($I^2C$) distribution circuit 250, which provides a serial communication interface to relatively low data transfer rate devices. The SPI/$I^2C$ controller 250 is connected to the mid-plane connector 235 and thereby provides control commands from the microcontroller 210 to the modules and other devices in the PMC 100. Further connections from SPI/$I^2C$ controller 250 are provided to devices such as a fan controller 251, a temperature sensor 252 and a power manager circuit 253, which manage the thermal characteristics of the system and prevent overheating.

The microcontroller 210 is also connected to Infra-Red (IR) interface 260, an RS232 interface 265, and an RF interface 267, that permit interconnection with external devices. Such interaction permits PMC 100 to control external devices. In addition the interfaces may receive control signals that control the operation of the programmable multimedia controller itself. It is expressly contemplated that various other interfaces, including WI-FI, Bluetooth™, ZigBee™ and other wired and wireless interfaces, may be used with the multimedia controller 100.

In addition, an Auxiliary Audio/Video Port 700 is provided for interconnecting one or more video game systems, camcorders, computers, karaoke machines, or other devices. A telephone interface 270 is provided for connecting to the public switch telephone network or to a private network, and to connect to one or more telephone handsets. Further, a device control interface 275 is provided to communicate with lighting, home automation, and motor and/or relay operated devices. An expansion port 280 is provided for linking several programmable multimedia controllers together to form an expanded system.

Finally, a front panel display 1150 permits presentation of status, configuration, and/or other information to a user. In one embodiment the front panel display may accept video data originating from any input source connected to the system, such that a user may preview video content on the front panel display 1150. In another embodiment, the front panel display 1150 may be implemented with a touch sensitive display and used as described below.

The Touch Sensitive Display

Figure 3:
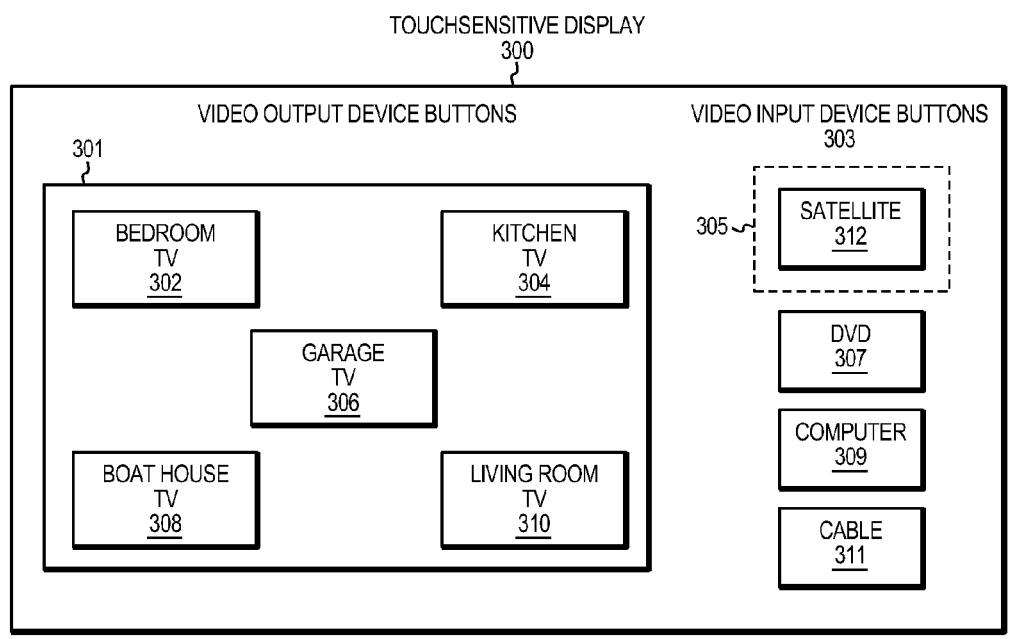
FIG. 3 is a schematic block diagram of a touch sensitive display having touch sensitive buttons for several video output display devices and video input devices.

FIG. 3 is an illustrative embodiment of a screen for touch sensitive display such as display 300 (FIG. 1) or front panel display 1150 (FIG. 2). FIG. 3 shows two groups of touch sensitive buttons. By way of example, the first group of buttons shall be referred to collectively as video output display device buttons 301. Each of video output display device buttons 301 corresponds with or represents a video output display device which is interconnected with PMC 100 (FIGS. 1 and 2). For example, in display 300, PMC 100 is illustratively interconnected with televisions in a bedroom, kitchen, garage, boathouse, and living room, corresponding to touch sensitive buttons 302, 304, 306, 308, and 310, respectively. It should be understood that other types and any number of video output display devices could be interconnected with PMC 100 in a particular application.

A second group of buttons is referred to collectively as video input device buttons 303. Each video input device button 303 corresponds with or represents a video input device interconnected with PMC 100. As shown, PMC 100 is interconnected with a satellite TV receiver, a DVD player, a computer and a cable TV box corresponding to buttons 305, 307, 309 and 311, respectively. In a case in which there is more than one of a given source type (for example, three cable boxes), then they are represented as a single video input device button. When the user selects this button, a "drawer" slides out on the display, illustratively at the bottom of the screen. This drawer or panel shows each of the three sources individually. In such a case, the single video input device button is functioning as a source type button.

In general, any video output display device or video input device represented by a button on display 300 may be chosen (selected) by a user simply touching the appropriate button. This is illustratively represented by dotted line 312 which is intended to indicate that the user has selected the satellite TV receiver as a desired video input device.

Figure 4:
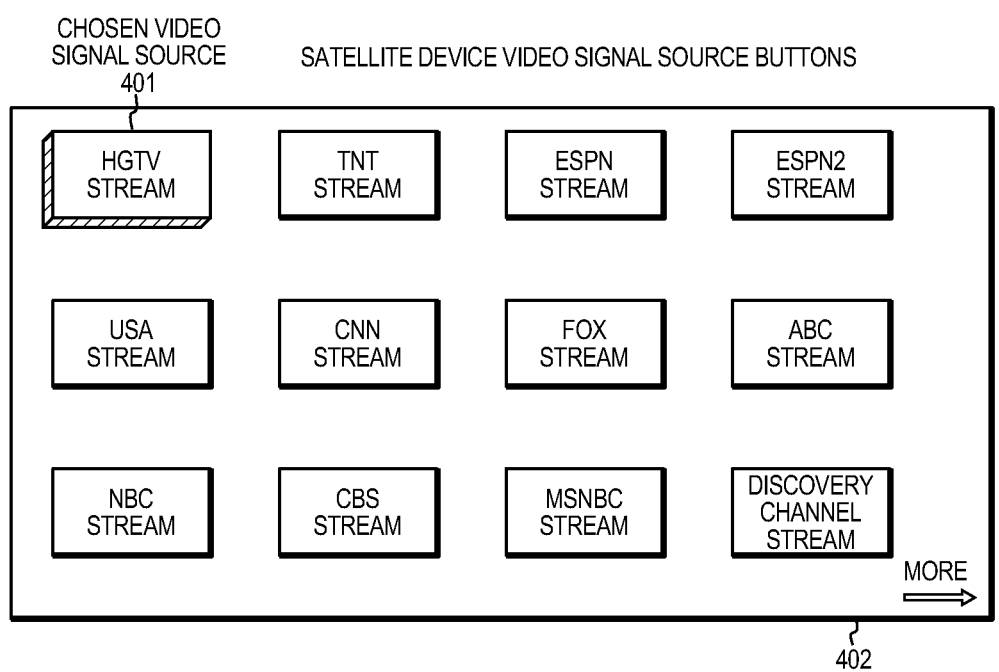
FIG. 4 is a schematic block diagram of an exemplary illustrative embodiment of a touch sensitive display from which a user chooses a video signal source for a video input device.

Having selected the satellite TV receiver by touching button 305, the user may be presented with a screen, such as that shown in FIG. 4, from which the user may select a desired video signal source (e.g., channel). Various available channels such as ESPN, TNT, HGTV, ABC, etc., are represented by touch sensitive buttons on touch sensitive display 402. The user may choose a desired video signal source simply by touching its associated button. As shown, HGTV has been chosen by a user and is denoted chosen video signal source button 401.

Advantageously, any of touch sensitive buttons shown in display 400 may display a live stream of the video signal source it represents. For example, the button denoted "ESPN Stream" may display the live ESPN video signal, thus enabling the user to see what content is currently playing before making a selection. The button can also be arranged to play sound from a selected audio-only channel.

Figure 5:
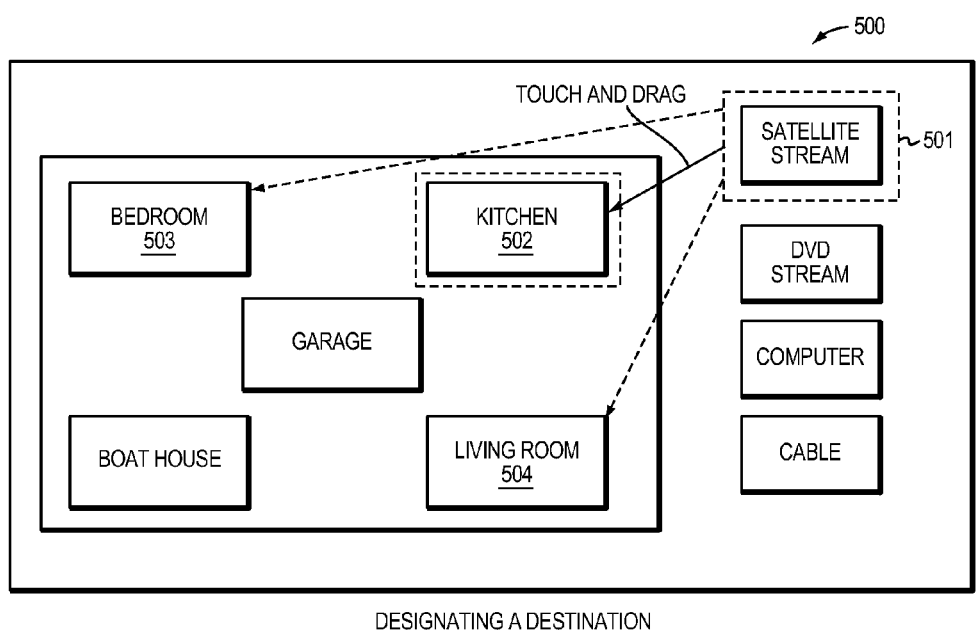
FIG. 5 is a detailed block diagram illustratively showing how a user designates a desired video input device for connection with a desired video output display device.

Having chosen a particular video input device and video signal source as described above, a user would typically wish to display the chosen video signal on a television or other device. This may be done by establishing a communication path through PMC 100, via video switch 220 (FIG. 2), between the video input device and one or more video output display devices. Referring now to FIG. 5, a user has established a connection between a video input device (i.e., satellite TV receiver 501) and each of three video output display devices (i.e., kitchen TV 502, bedroom TV 503, and living room TV 504). To establish the connections shown in FIG. 5, the user first selects a desired video output display device, then selects a desire video input source and drags and drops the corresponding button onto the previously selected video output display device button.

When the user drops a selected video input device button onto a video output display device button, the video output display device button is altered in appearance. For example, if the user drags satellite TV receiver button 501 and drops it onto kitchen TV button 502, then the appearance of kitchen TV button 502 will change and display the video stream/signal of whatever video signal source the user previously selected in display screen 400.

Figure 6:
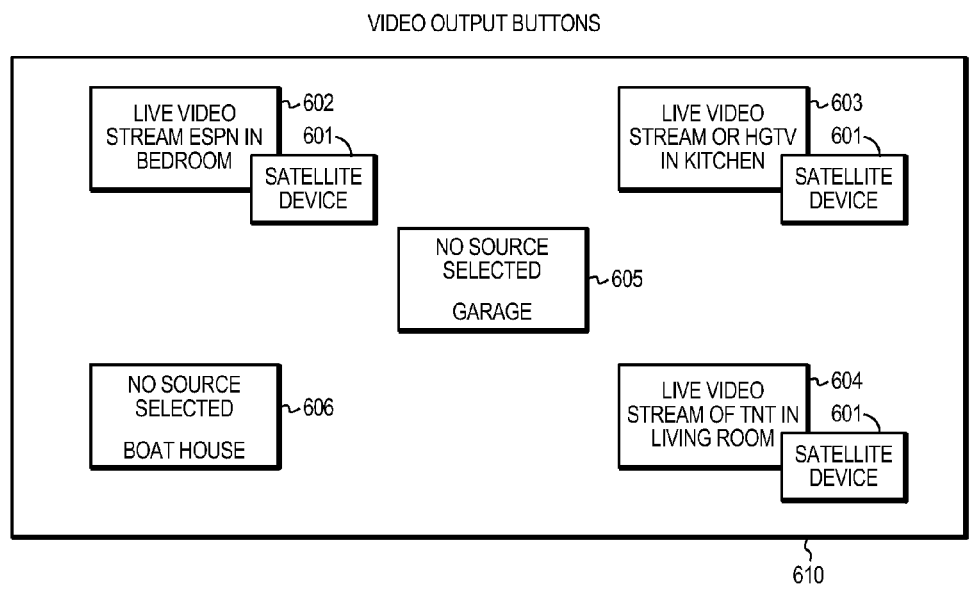
FIG. 6 is a more detailed block diagram illustratively showing the appearance of video output display device buttons on a touch sensitive display once video input devices are chosen by a user.

In addition, as may be seen best in FIG. 6, a small tag 601 overlays one corner of each video output display device button once a connection is established between the corresponding video output display device and a video input source. Tag 601 provides a visual indicator for the user as to which video input device is currently connected to a particular output device. As shown in FIG. 6, connections have been established between a satellite TV receiver and each of the televisions located in bedroom 602, kitchen 603, and living room 604. In the event that no connection has been established between a video input device and a video output display device, the corresponding video output display device buttons appear empty as indicated by buttons 605 and 606.

Figure 7:
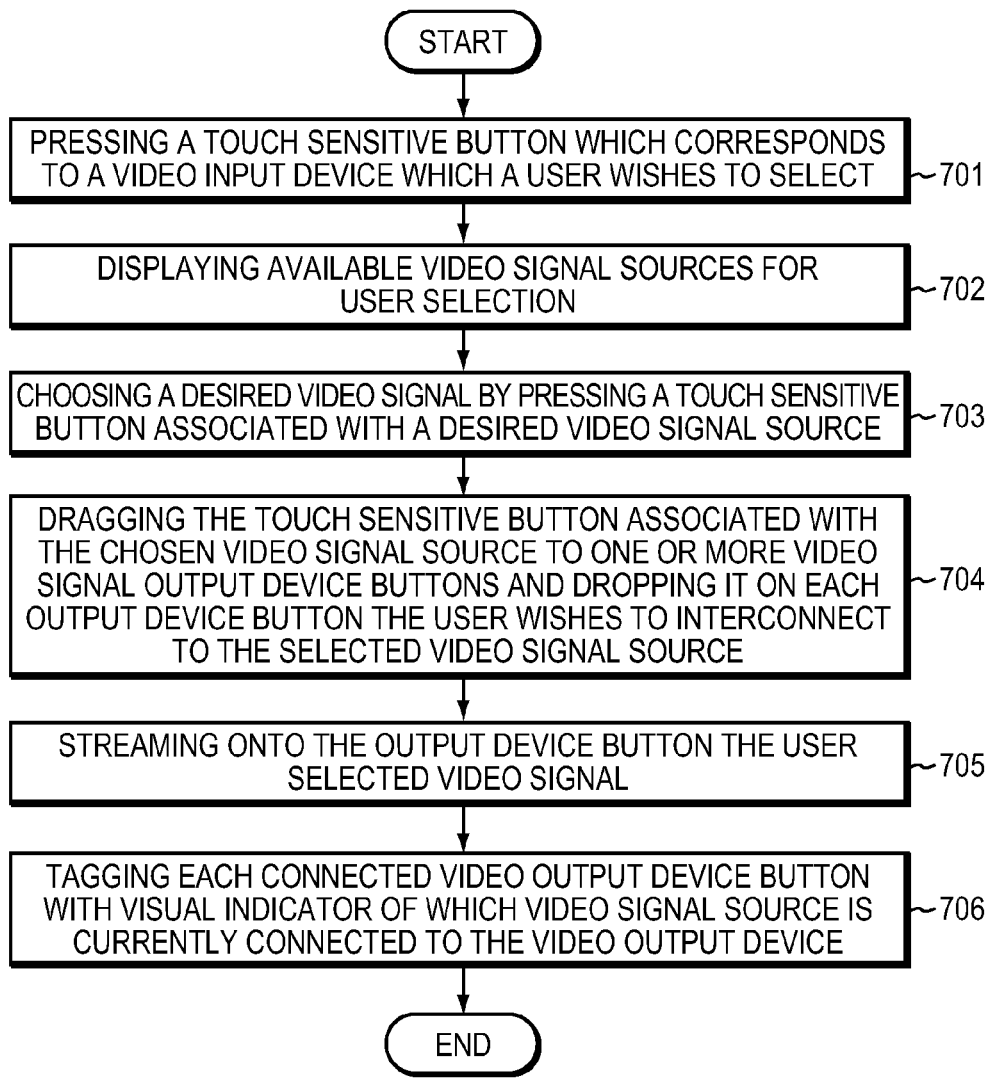
FIG. 7 is a flowchart showing a method for designating a destination for a video input device.

FIG. 7 is flowchart showing the steps for a user to select a desired video signal source and establish a connection between a desired video input device and a desired video output display device. Initially, a user presses a touch sensitive button which corresponds to a video input device on which a user wishes to designate to a video output display device (step 701) on the touch sensitive display 300 (FIG. 1). Once a video input device is selected, the PMC 100 may cause the display 300 to display all of the available video signal sources for that particular video input device (step 702). The user can then choose a desired video signal by pressing a touch sensitive button associated with a desired video signal source (step 703). Once the user selects a video signal source, the user then drags a touch sensitive button associated with the chosen source and drops it on one or more desired video signal output device buttons. PMC 100 will respond by establishing appropriate connections through its video switch.

In response to the user dropping the selected video input device button on a video output display device button, a live video signal begins to stream onto the output device button (step 705). Finally, a small tag is added to the connected output device button that serves as a visual indicator which video signal source is currently connected to the video output display device. (step 706).

Figure 8:
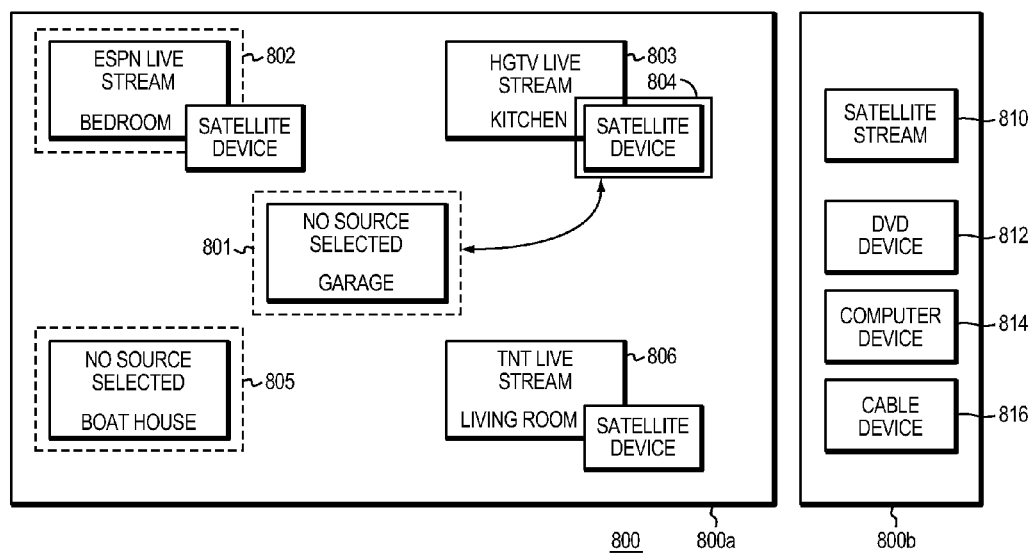
FIG. 8 is a detailed block diagram illustratively showing how a user of a programmable multimedia controller can broadcast a video signal from one source to multiple video output display devices.
Figure 9:
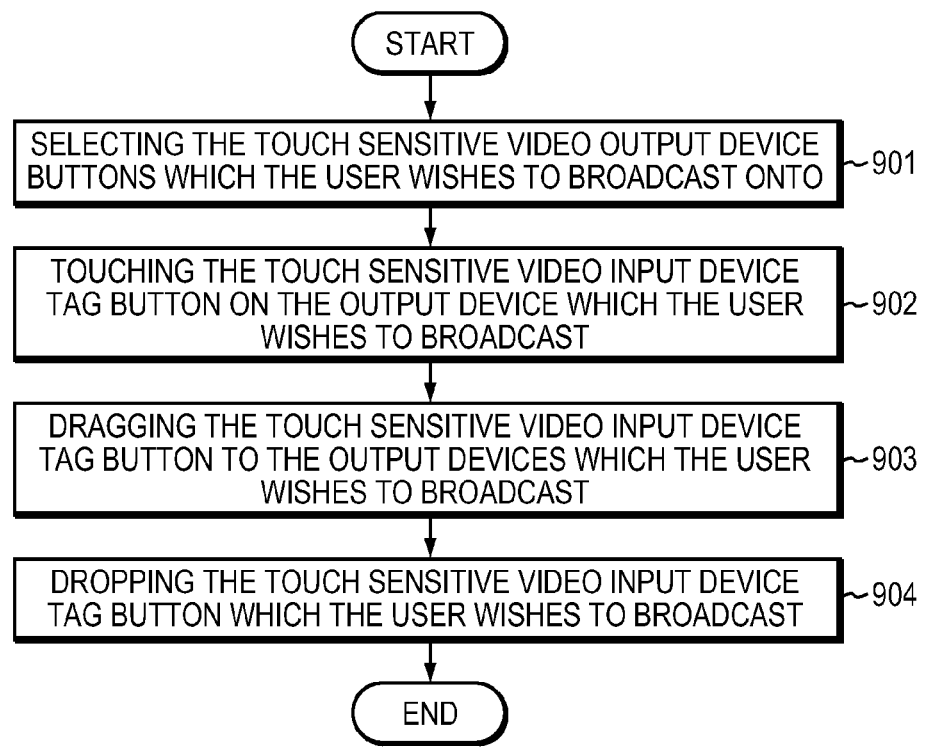
FIG. 9 is a flowchart showing a method for broadcasting a video signal source.

FIGS. 8 and 9 show an illustrative touch sensitive display 800 that includes a first portion 800a that displays the group of video output display devices, such as the television in the bedroom 802, the kitchen 803, the garage 801, the boat house 805 and the living room 806. The second portion 800b of the display screen 800 illustrates the group of video input devices including the satellite stream 810, the DVD device 812, the computer 814 and the cable device 816. FIG. 9 illustrates the method in which the user is able to broadcast the same video signal source to multiple video output display devices. Initially, the user selects the video output display devices to which the user wishes to broadcast (step 901). For example, as shown in FIG. 8, the user has selected video output display device buttons 801, 802, and 803 as denoted by the dotted lines surrounding those buttons. Video output display device 802 (i.e., the bedroom TV) is currently connected to a satellite TV receiver and is displaying ESPN. Video output display devices 801 and 803 currently have no video input devices connected to them.

Figure 10:
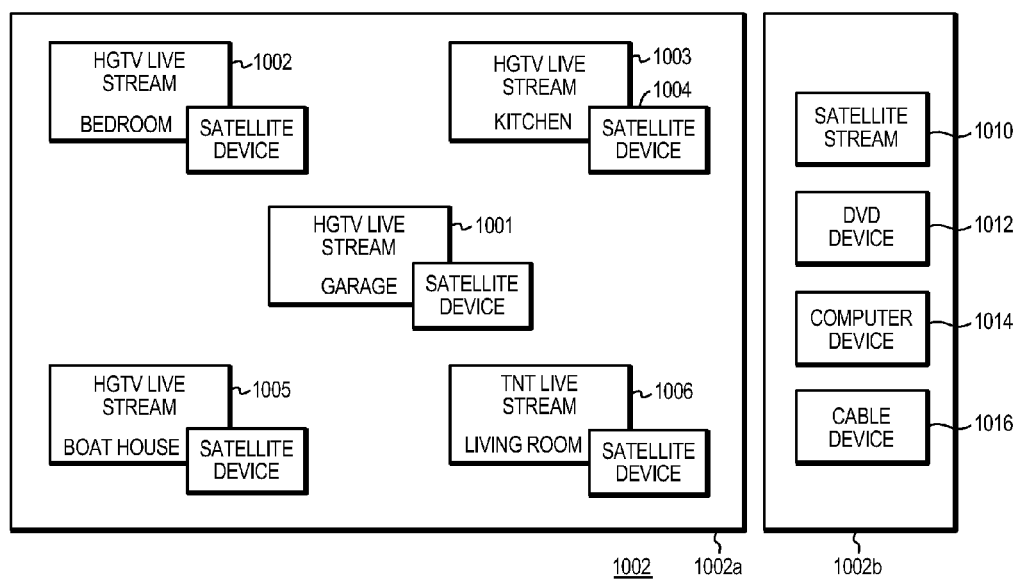
FIG. 10 is a detailed block diagram illustratively showing what the video input device buttons look like after a user has implemented a broadcast.

Next, assume that the user wishes to broadcast the HGTV signal currently playing on kitchen TV 803 on garage TV 801 and boathouse TV 805. To do this, the user touches the tag button 804 and drags and drops it onto output device button 801. Because both output device buttons 801 and 803 were previously selected, both output devices will now be connected to receive the HGTV signal as shown in FIG. 10. Video output display device button 806 continues to operate with no change because it was not selected to be apart of the broadcast by the user in step 901. As shown in FIG. 10, the group of video output display device buttons 1001-1006 are shown in the first portion 1002a of the display 1002 and the group of video input sources 1010 through 1016 are shown in second portion 1002b. In the example of FIG. 10, the PMC is now streaming HGTV content from the video signal source, which is the satellite 1010, and the buttons for each television on which the content from that video input source 1010 is streaming are tagged with the satellite video input device tag button 1004.

Figure 11:
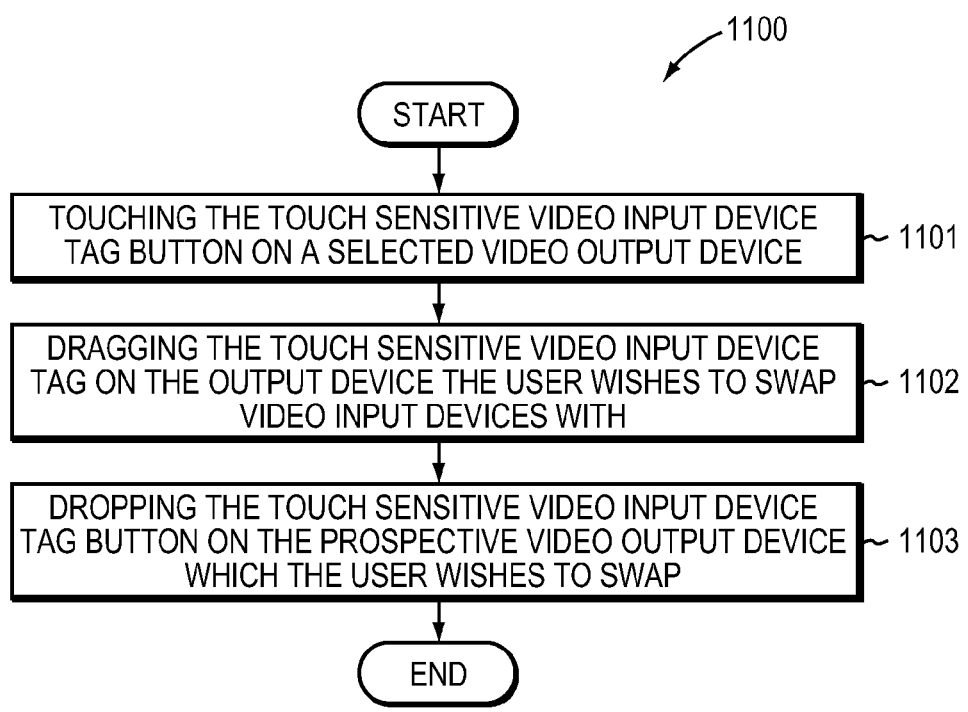
FIG. 11 is a flowchart showing a method for swapping a video input device or video signal source between two or more video output display devices.

Finally the user may also swap video signal sources or video input devices. FIG. 11 is a flowchart showing a method for swapping a video input device or video signal source between two or more video output display devices. First, in step 1101, the user touches the touch sensitive tag button on a selected video output display device. Then the user drags the tag on the output device the user wishes to swap video input devices with (step 1102) and drops the tag button on the video output display device button which is the target of the swap (step 1103). Again, once the swap has been made, the video streaming on the affected video output display device buttons is altered to indicate to the user what is now being transmitted to that output device.

The foregoing description has been directed to particular embodiments of this invention. It will be apparent; that other variations and modifications may be made to the described embodiments, with the attainment of some or all of their advantages. Additionally, the procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. An apparatus for controlling and selecting video input for one or more video output display devices, comprising:
    a programmable multimedia controller;
    one or more video output display devices interconnected with the programmable multimedia controller;
    one or more video input devices interconnected with the programmable multimedia controller; and
    a touch sensitive display interconnected with the programmable multimedia controller, the display and programmable multimedia controller collectively configured to
        present a first plurality of touch sensitive buttons that each represent a particular video output display device of the one or more video output display devices,
        present a second plurality of touch sensitive buttons that each represent a video input device,
        receive at least one video signal from the video input devices,
        display the at least one video signal in one or more touch sensitive buttons of the second plurality that each represent a video input device,
        in response to one of the one or more touch sensitive buttons of the second plurality being dragged and dropped by a user onto a button of the first plurality,
            display the at least one video signal in the button of the first plurality along with a visual indicator that indicates the video input device that sources the at least one video signal and
            establish a communication path for the at least one video signal to a user selected video output display device.

2. The apparatus for controlling and selecting video input for output on one or more video output display devices as defined in claim 1 wherein said programmable multimedia controller is programmed to, in response to the user dragging and dropping the one or more touch sensitive buttons of the second plurality onto the button of the first plurality, establish the communication path via a video switch to direct the video content signals from the at least one video input device to the user selected video output display device.

3. The apparatus for controlling and selecting video input for output on one or more video output display devices as defined in claim 1 wherein said programmable multimedia controller is connected to the Internet.

4. The apparatus for controlling and selecting video input for output on one or more video output display devices as defined in claim 1 wherein said programmable multimedia controller includes a microcontroller programmed to manage the general operation of the system, and a video switch and audio switch being coupled to the microcontroller via a bus.

5. The apparatus for controlling and selecting video input for output on one or more video output display devices as defined in claim 1 wherein said video switch is a crosspoint switch that is capable of switching a number of connections simultaneously.

6. The apparatus for controlling and selecting video input for output on one or more video output display devices as defined in claim 1 wherein said video switch is a time division multiplexing switch for switching digital signals.

7. The apparatus for controlling and selecting video input for output on one or more video output display devices as defined in claim 1 wherein said one or more video output display devices include televisions in various locations in a house or commercial establishment.

8. A method for controlling and selecting video input for output on one or more video output display devices, comprising:
    interconnecting one or more video output display devices with a programmable multimedia controller;
    interconnecting one or more video input devices with the programmable multimedia controller;
    interconnecting a touch sensitive display with the programmable multimedia controller;

presenting a first plurality of touch sensitive buttons on the touch sensitive display that each represent a particular video output display device of the one or more video output display devices;

presenting a second plurality of touch sensitive buttons on the touch sensitive display that each represent a video input device;

receiving at least one video signal from at least one video input device;

displaying the at least one video signal of the at least one video input device in one or more touch sensitive buttons of the second plurality that each represent a video input device; and in response to a user dragging and dropping one or more touch sensitive buttons of the second plurality onto a button of the first plurality, display the at least one video signal of the at least one video input device in the button of the first plurality along with a visual indicator that indicates the at least one video input device and command the programmable multimedia controller to establish a communication path for an associated video signal to a user selected video output display device represented by the button of the first plurality.

9. The method for controlling and selecting media input for output on one or more video output display devices as defined in claim 8, further comprising:

in response to the user dragging and dropping the one or more touch sensitive buttons of the second plurality onto the button of the first plurality, the programmable controller commands an associated video switch to open the communication path between the at least one video input device and the user selected video output display device and to connect a selected video signal from a selected video input source to the selected video output display device.

10. The method for controlling and selecting video input for output on one or more video output display devices as defined in claim 8, further comprising:

streaming video content from a selected video input device to the touch sensitive display such that the user can view programming of the selected video input device in a panel on the touch sensitive display.

11. The method for controlling and selecting video input for output on one or more video output display devices as defined in claim 8, further comprising:

on the touch sensitive screen, in response to the user dragging and dropping the one or more touch sensitive buttons of the second plurality onto a plurality of buttons of the first plurality, establishing a communication path for an associated video signal to each of a plurality of selected video output display devices represented by the buttons of the first plurality, and display the video content represented by the associated video signal on each of the selected video output display devices to thereby broadcast the video content on each of those selected video output display devices.

12. The method for controlling and selecting video input for output on one or more video output display devices as defined in claim 8, further comprising:

touching the visual indicator on a selected video output display device button;

dragging the visual indicator onto a video output display device button which is a target of a swap;

dropping the visual indicator on a prospective video output display device button which the user wishes to swap; and transmitting streaming video from the video input device indicated by the visual indicator to the video output display device that is the target of the swap.

13. The method for controlling and selecting video input for output on one or more video output display devices as defined in claim 8, wherein a video output display device is: a TV, a CRT, a touch panel, a flat panel display, a computer monitor or personal media player.

14. The method for controlling and selecting video input for output on one or more video output display devices as defined in claim 8, wherein a video input device is cable television, satellite television, a DVD player, a DVR, a VCR, a computer, or a video gaming system.

15. The method for controlling and selecting video input for output on one or more video output display devices as defined in claim 8, wherein a video input device is an audio input device including at least one of a radio, satellite radio, CD player, personal media player and digital audio player.

\* \* \* \* \*